US007051852B2

(12) United States Patent
Maret (10) Patent No.: US 7,051,852 B2
(45) Date of Patent: May 30, 2006

(54) SUSPENSION RESTRAINT DEVICES

(76) Inventor: Kevin Maret, 2111 Atwood La., Lincoln, NE (US) 68521

( * ) Notice: Subject to any disclaimer, the term of this patent is extended or adjusted under 35 U.S.C. 154(b) by 0 days.

(21) Appl. No.: 10/627,351

(22) Filed: Jul. 26, 2003

(65) Prior Publication Data

US 2004/0055839 A1 Mar. 25, 2004

Related U.S. Application Data

(60) Provisional application No. 60/399,004, filed on Jul. 26, 2002.

(51) Int. Cl.
*F16F 9/32* (2006.01)
(52) U.S. Cl. .............. 188/300; 267/64.12; 280/279
(58) Field of Classification Search ........... 188/300, 188/285, 299.1, 266.1, 321.11; 267/64.12, 267/64.16, 64.28, 218, DIG. 1, DIG. 2; 280/124.157, 280/124.154, 124.1, 276, 279, 284, 287, 280/288; 248/404, 406.2, 407–409, 412, 248/125.8, 157, 161; 403/109.1, 109.2, 109.3, 403/109.6, 379.5; 297/215.13
See application file for complete search history.

(56) References Cited

U.S. PATENT DOCUMENTS

| 3,989,261 A | * | 11/1976 | Kawaguchi ............. 280/276 |
| 4,572,534 A | * | 2/1986 | Heyl ...................... 280/276 |
| 4,609,202 A | * | 9/1986 | Miyakoshi et al. ...... 280/276 |
| 4,735,276 A | * | 4/1988 | Burton .................... 180/219 |
| 4,884,842 A | * | 12/1989 | Finkelstein ............. 297/331 |
| 5,022,501 A | * | 6/1991 | Hayashi et al. .......... 188/300 |
| 5,044,592 A | * | 9/1991 | Cienfuegos .............. 248/408 |
| 5,344,170 A | * | 9/1994 | Ochoa .................... 280/283 |
| 5,509,674 A | * | 4/1996 | Browning ................ 280/276 |
| 6,202,971 B1 | * | 3/2001 | Duncan ................... 248/407 |
| 6,354,557 B1 | * | 3/2002 | Walsh ..................... 248/600 |

OTHER PUBLICATIONS

"10 Hidden Secrets of Speed, Holeshot Devices, The Best 50 Feet of Your Life," Advertisement, 2 pages (Feb. 2002).
"? Anything, We've Got the Answer", Advertisement by Racerxill, 1 page (Feb. 2002).
"Fastbreak Launch System" Advertisement by Motovation Racing Products, 1 page (Feb. 2002).
"Kickstart, Locked and Loaded" Advertisement, 1 page (Oct. 2001).
"Inside Line, DR Tested, ProCircuit Launch Control" Advertisement by ProCircuit, 1 page (Feb. 2002).

(Continued)

*Primary Examiner*—Pam Rodriguez
(74) *Attorney, Agent, or Firm*—Frank P. Becking (57) ABSTRACT

Starting devices are provided that are adapted to help hold the front end of a motorcycle down, especially in a "hole shot" or starting applications. The devices allow a rider to compress the suspension fork of the motorcycle down by about 3 to about 4 inches and temporarily lock the fork in a given position. Certain variations provide for selection one of a number of positions. Lock-down and automatic release are accomplished by pushing in a spring loaded lock button while the fork struts are compressed. A pin member interfaces with a stop member located on the fork to prevent decompression of the fork. Upon further compression of the fork (e.g., due to braking) the pin is released and the spring member draws the pin out of the way to allow clearance for free fork travel.

16 Claims, 5 Drawing Sheets

OTHER PUBLICATIONS

"Changing the Weight Bias, The Whole Truth About Holeshot Devices" Advertisement from www.motocrossingactionmag.com pp. 28-29 (Feb. 2002).

"Gearhead Heaven, ProCircuit Launch Control Holeshot Device" Advertisement from www.motocrossactionmag.com p. 34 (Feb. 2002).

"Tear Offs" Pro Circuit Advertisement 1 page (Feb. 2002).

"Factory Secret Revealed" Advertisement by Works Connection, 2 pages (Feb. 2002).

New Product, Launch Control Advertisement, 1 page (Feb. 2002).

Atomic22 Holeshot Device Advertisement, 1 page (Feb. 2002).

Improve Holeshot Performance by Mx ProWay Advertisement, 1 page (Feb. 2002).

* cited by examiner

SUSPENSION RESTRAINT DEVICES

CROSS REFERENCE TO RELATED APPLICATIONS

This claims the benefit of U.S. Provisional Patent Application Ser. No. 60/399,004, filed Jul. 26, 2002 and entitled, "Suspension Restraint Device," which is incorporated by reference herein in its entirety. It is specifically noted that certain of the information from the referenced Provisional Patent Application has been omitted herein. However, the above incorporation is intended as antecedent basis for explicitly setting forth such text herein or in a continuing application should it be desired.

FIELD OF THE INVENTION

This invention relates to overall balance, traction and power transfer available to the rear wheel of a motocross motorcycle. More particularly, assemblies are provided to lower and temporarily lock the suspension fork of such a motorcycle in a position to improve starting with respect to traction and control.

BACKGROUND

In general, when a rider leaves the starting gate in a motocross event or practice, the throttle of the motorcycle is held wide open and the clutch is dumped causing the front of the bike to rise into a wheelie. The rider then has to manipulate the throttle to control the front end of the motorcycle—often by backing off the throttle slightly. As a solution to this problem, it is known to temporarily lock down the front fork of the motorcycle using a simple hook interfacing with a corresponding hole in one of the plastic fork guards. While effective, the setup was unacceptable from the perspective of wear-and-tear on the fork guard (rubbing or scoring along the length of the fork guard because of the hook, as well as compressive damage to the opening created in the fork guard) and the potential for inadvertent engagement since the hook remains jutting outward after disengagement from a fork guard.

An improved solution is offered by the present invention. It is improved not only in terms of better wear-and-tear and safety, but as potentially offering superior tunability as well as configurations suited for use with a greater variety of fork styles.

SUMMARY OF THE INVENTION

Devices of the present invention are adapted to provide a starting device to help hold the front end down of a motorcycle to the ground, especially in a "hole shot" or starting application. Generally, this goal is accomplished by a rider compressing the suspension fork of the motorcycle down by about 3 to about 4 inches and pushing in a spring loaded lock button while the fork struts are compressed so as to lock an interface member associated with the push button onto or into an interface member mounted on the fork. The fork interface member may be a ring (with or without an interface groove) clamped to the fork. Alternatively, it may be a feature integrated with the fork.

In any case, thus locked, it becomes difficult to wheelie the motorcycle of the start while holding the throttle wide open. When the rider dives into the first corner of a racetrack and applies the front brake to slow down, the braking action compresses the forks slightly—driving the ring or other fork interface portion towards the ground, releasing the lock interface member. This release causes the spring loaded push button to pop back providing clearance between the interface members, thereby allowing the rider the full range of available suspension for the remainder of the race.

One variation of the invention contemplates providing a plurality (preferably only two) push buttons incorporated in a single lock-down device. Alternately, or additionally, the fork interface member may include a plurality of engagement positions or multiple fork-side engagement members may be provided. However configured, such provisions allow a rider to choose the button and/or fork interface position that is optimal for given track conditions.

As conditions change throughout the day, a rider might choose to select a setup with a different degree for fork compression and temporary lockdown. For example, with a two-button device, if the conditions are tacky in the first moto, then the rider should choose the lower button. If the conditions dry out throughout the days racing, the rider can use the upper button for the 2nd moto. If the start is concrete, then the rider can use the upper button all the time—or no lockdown. The rider can easily try both positions before each moto and see which works best without switching fork guards and purchasing extra button devices. The invention includes such methodology in addition to the various devices described.

BRIEF DESCRIPTION OF THE FIGURES

While certain figures are proportionally drawn or indicative of actual hardware, they may equally be regarded as diagrammatic in the information they convey. To facilitate understanding, the same reference numerals have been used (where practical) to designate similar elements that are common to the figures. Some such numbers have, however, been omitted.

DETAILED DESCRIPTION

It is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned or referenced in the attached pages/herein (e.g., articles, publications, advertisements and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

Methodology

The subject devices shown in the figures are installed with a base attached either on a fork guard or a supplemental strap member. Yet, it is contemplated that the base members/portions may be incorporated into such structure.

In addition, the figures also show situations where a supplemental interface or engagement ring is attached to the fork (on a stanchion or slider) to interact with the pin(s) provided in a given base. Again, however, it is contemplated that the fork interface members/portions may be incorporated into such structure.

The manner of attaching the various components will depend on those selected and the style of fork chosen (be it a standard or inverted in style). Completing the necessary assembly is well within the abilities of those with ordinary skill in the art. As guidance, however, it is noted that the precise position for mounting components should take into consideration the amount of sag the rider has in the front suspension, along with riding ability. The faster the rider, the further down the rider may want to mount the device in order to compress the suspension further. Still further, placement may vary depending on typical conditions. If the starting ground condition is hard packed, dry slick or concrete, lower down buttons will generally not work as well as the buttons mounted up higher. The lower placement of the devices take too much traction from the rear wheel in these conditions. In tacky conditions, however, the lower down the compression, the better the bike got off the start.

As for use of the subject devices, when loading, calking or activating them, it is recommended that the motorcycle engine first be OFF. Then, holding the front brake while sitting on bike, the front end is compressed or pushed down with a rocking motion. When the forks compress, the user or a second person pushes in the pin/button on the device to engage it. As the fork rebounds, the components engage—holding the forks firmly in place and compressed as desired.

The device disengages automatically the first time the suspension compresses below the lock-out position. This event will generally occur during braking when the bike is running and in motion.

It is recommended not to engage the subject devices until at the starting line. Also, one should not activate the device while the motorcycle is sitting on a stand. Once activated, the forks apply pressure by trying to rebound and this can damage components if left connected for a period of time. Also, one should avoid locating his or her head directly on or near handlebars while the device is latched. Finally, it is recommended that one check the conditions at the starting gate. It is important for one to "farm" the area behind the gate ensuring a smooth ramp of dirt over the starting gate when down. If there is a large bump, this can deactivate the device by inadvertent compression when the front wheel hits the bump, thereby defeating the purpose of the device which is to allow the motorcycle forks to remain in a compressed state though the entire start of a race.

Devices

Figure 1A:
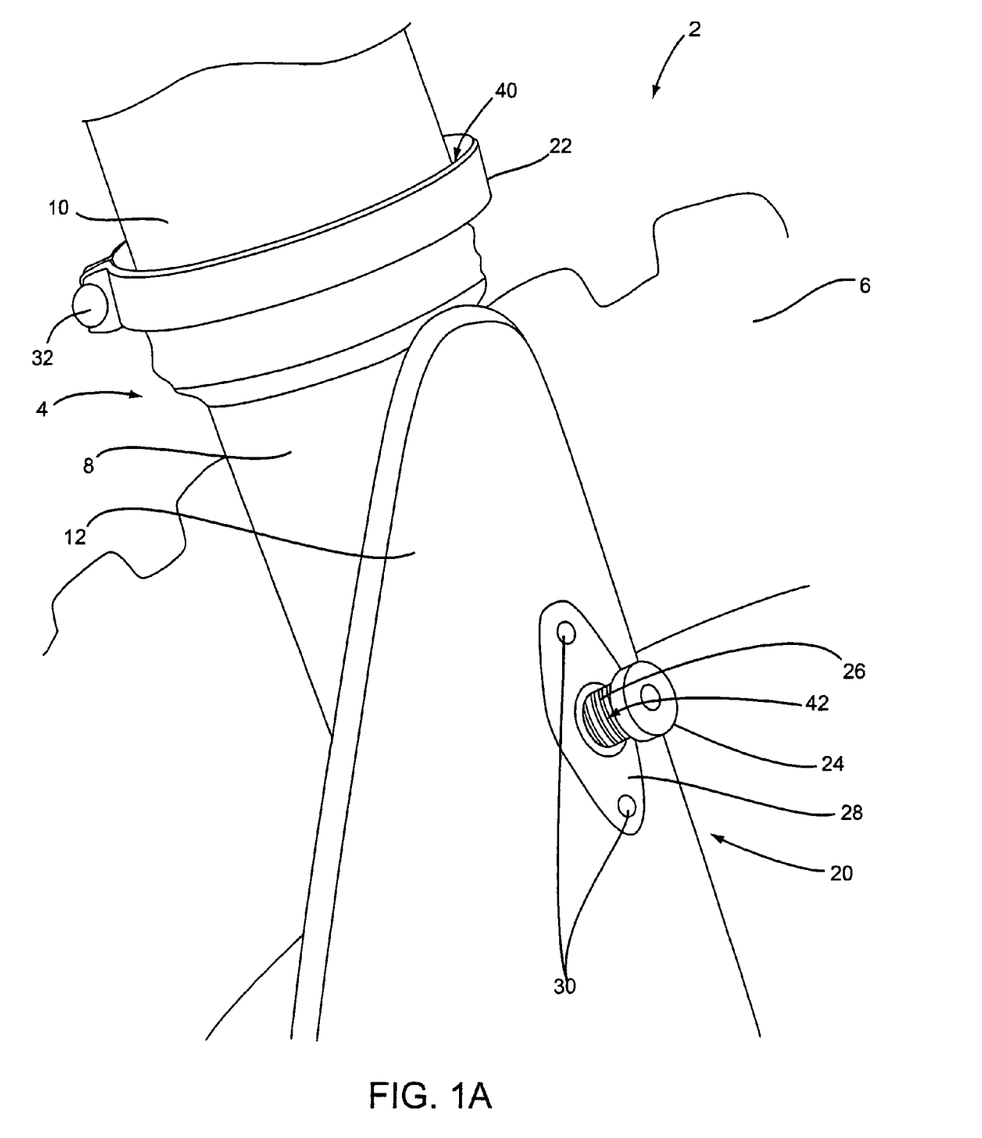
FIGS. 1A and 1B are perspective views of a first variation of the invention installed on different styles of motorcycle forks.
Figure 1B:
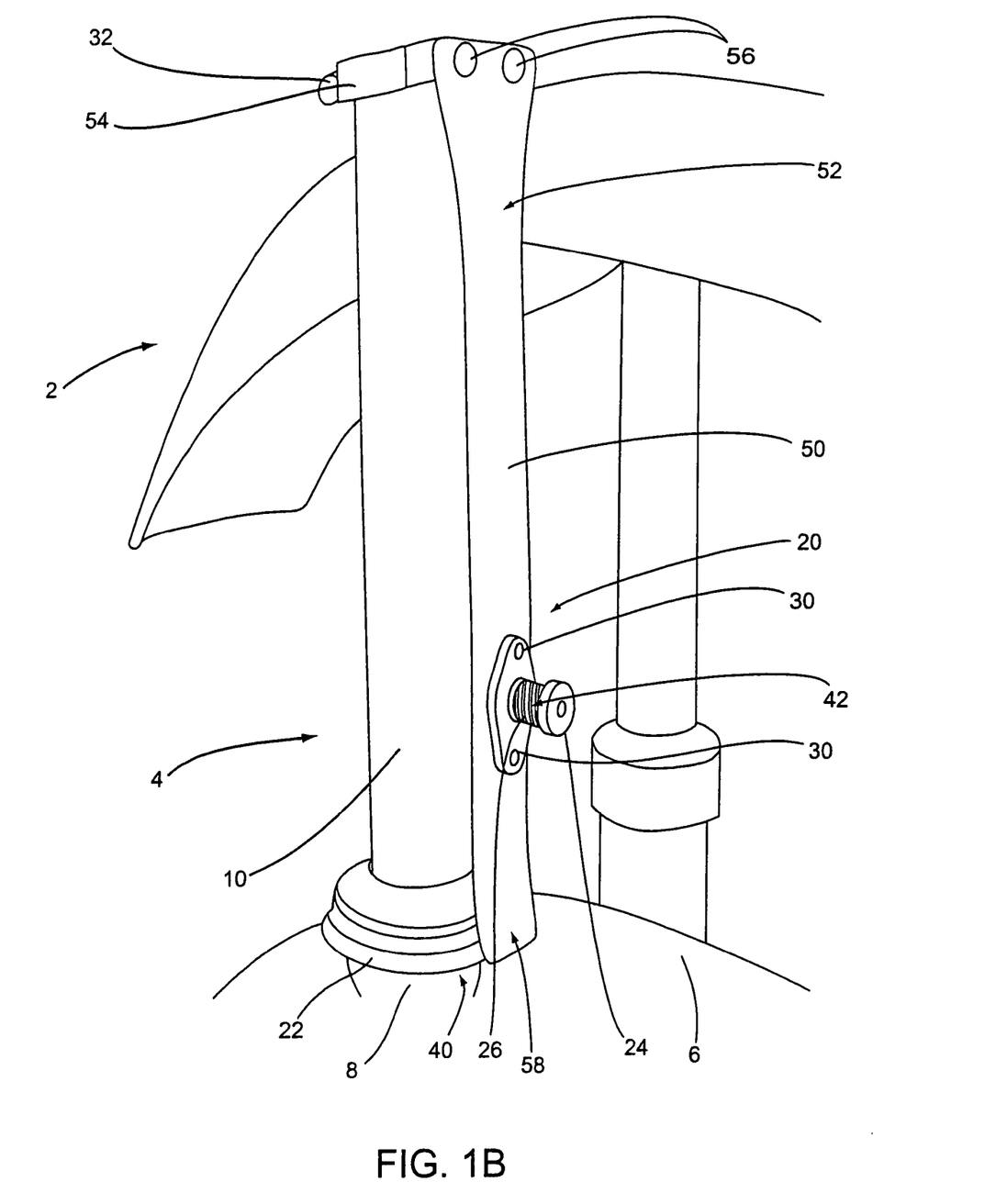

As to specific hardware that may be used in the invention, the figures provide various examples. Turning to FIGS. 1A and 1B, a front end 2 of a motorcycle is shown. It includes a fork 4, and wheel 6.

With specific reference to FIG. 1A, the fork is an inverted-style fork. Its lower tubes 8 are slidingly received within upper tubes 10 mounted to the motorcycle. A guard 12 is provided in front of the lower tubes. The subject invention comprises base assembly 20 and interface ring 22—either in packaged combination or installed as shown. The same holds true for other variations of the invention.

Generally, only one combination of parts forming a restraint device is installed on a single side of the fork. While not necessary, it still may be desired to have redundant latching systems by providing an identical set of parts at the same height on both fork legs. Alternatively, it may be desired to have restraint device(s) set at different heights on each leg to provide different height latching positions.

In any case, the base assembly in FIGS. 1A and 1B illustrate a push button 24 design. A spring 26 is interposed between a base or housing member 28 and the button. It is optionally secured with screws/bolts 30 from behind.

The fork-side interface member used in each design (though other options are possible) is in the form of a ring. The ring is a split-ring, clamped where desired using a screw/bolt 32. The ring preferably includes a slot 40 to interface with a pin or piston member 42.

Note that the variation of the invention in FIG. 1B differs in its final assembled configuration from that in FIG. 1B in that additional components are provided that are not available on a stock fork or motorcycle. Particularly, an extension member or strap 50 is provided. Its proximal end 52 is secured to a clamp 54 on the upper tube by screws/bolts 56. Another pinch-bolt 32 may be provided to secure clamp 54. A distal end 58 of strap 50 is set to overlap lower tube 8 and any potentially interfering structure such as ring 22 to avoid inadvertent catching it upon compression of the fork.

Figure 2:
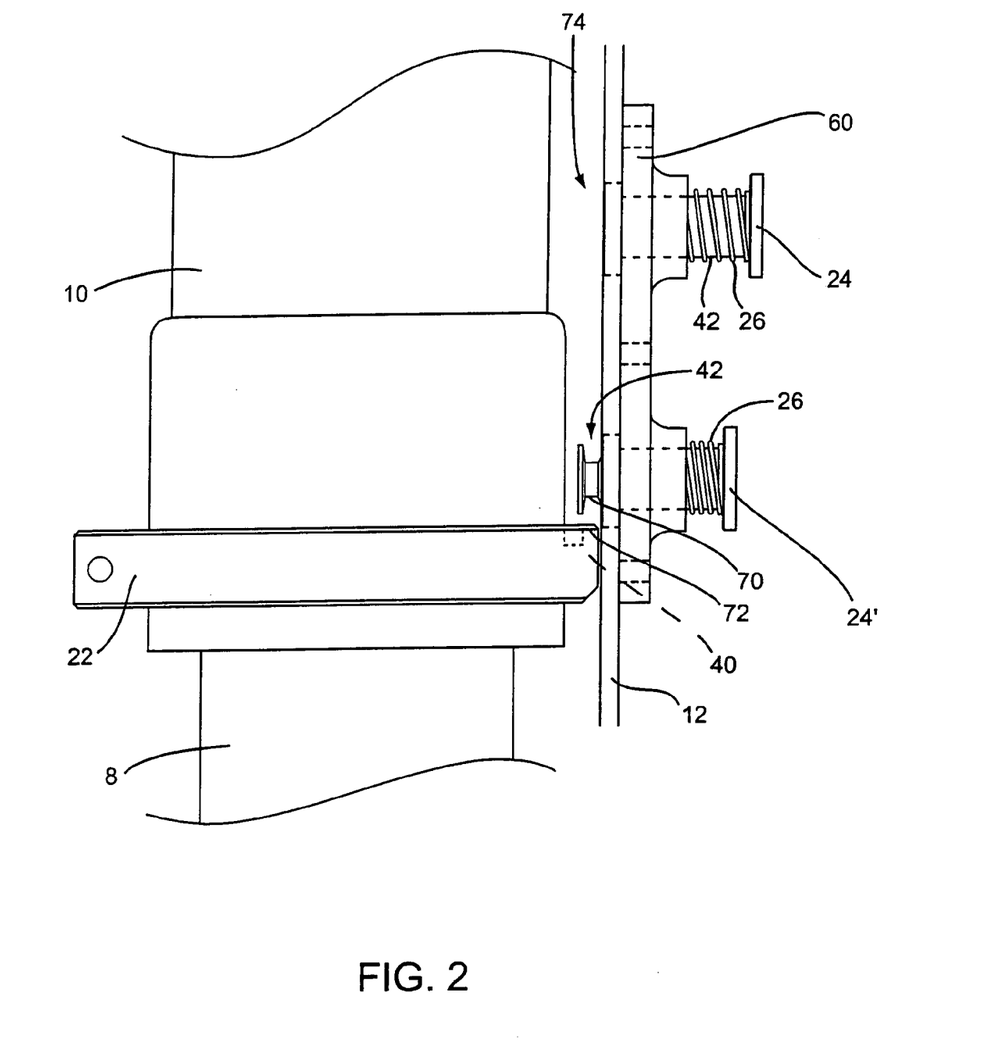
FIG. 2 is a side view of multi-button variation of the invention.

FIG. 2 shows another variation of the invention in which a multi-button/pin base design is in preparation for lockdown. More particularly, base 60 is adapted to slidingly receive two pins 42. A multi-button device allows a rider to have a choice of fork compression at the start without the need to install multiple lock-down components.

In either case, the choice of adjustable height offered may be used simply to accommodate various rider weights, suspension sag, ability and/or to account for starting area conditions. Significant adjustment options are provided by pin spacing of between about 1 and about 2 inches apart (in a vertical direction—i.e., along the axis of the fork). It may be desired to have the pins locations about 1.5 inches apart. Also, more or less of a range than specifically noted may be desired (e.g., as in between about 0.5 and 3.5 inches, possibly in two, three or four steps for greater spreads).

Another feature illustrated by FIG. 2 is the manner in which a recess 70 may be provided in the pin to prevent lateral movement of the components when engaged with complementary feature 72 of the fork interface member 22. While such features are highly advantageous, they need not—however—be provided.

Figure 3A:
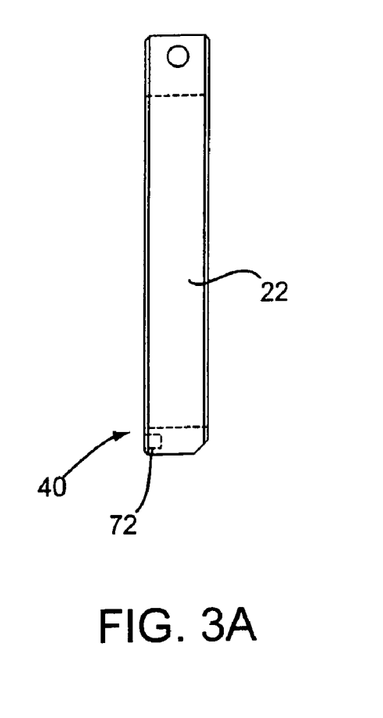
FIGS. 3A and 3B are side and top views, respectively, of a fork-side interface member as may be used with any of the variations of the invention.
Figure 3B:
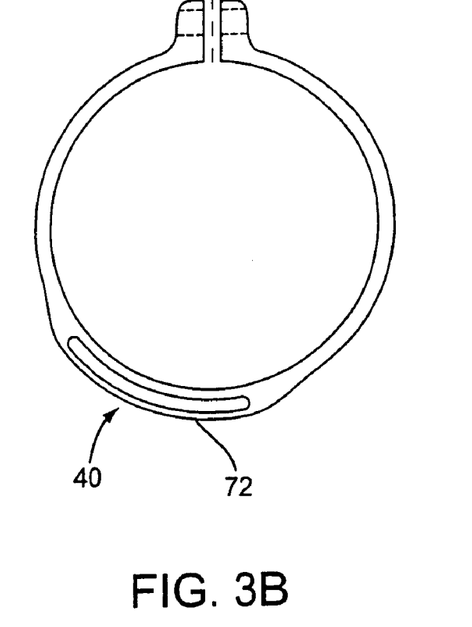

FIGS. 3A and 3B better illustrate recess 40 and wall 72 defining the same. FIG. 3B also clearly illustrates the split-ring design, as well as the manner in which the recess may be offset to accommodate ideal placement relative to a guard or other Original Equipment (OE/OEM) structure, especially in view of available clearance.

Figure 4A:
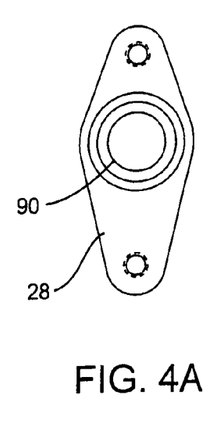
FIGS. 4A and 4B are top and side views, respectively, showing the base of the variation of the invention in FIGS. 1A and 1B.
Figure 4B:
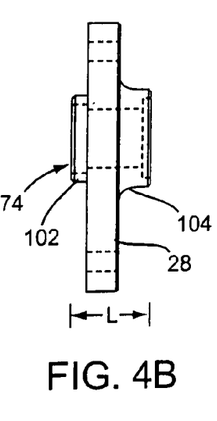
Figure 5A:
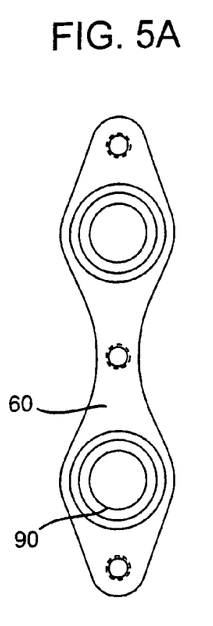
FIGS. 5A and 5B are top and side views, respectively, showing the base of the variation of the invention in FIG. 2.
Figure 5B:
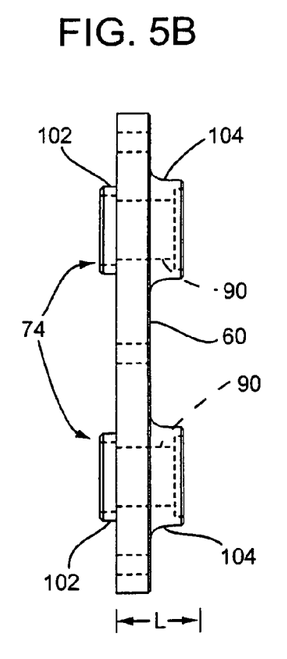

Returning to FIG. 2, however, it clearly illustrates the manner in which pin 42 is preferably fully recessed (see upper pin) when not engaged or advanced. The bias provided by the spring draws the part fully within corresponding recessed area(s) 74. The base recess features 74 accommodating a distal end of the pin 42 are also apparent in the views of base pieces in FIGS. 4B and 5B. FIGS. 4A and 4B show views of the designs looking from the front of the fork.

Figure 6:
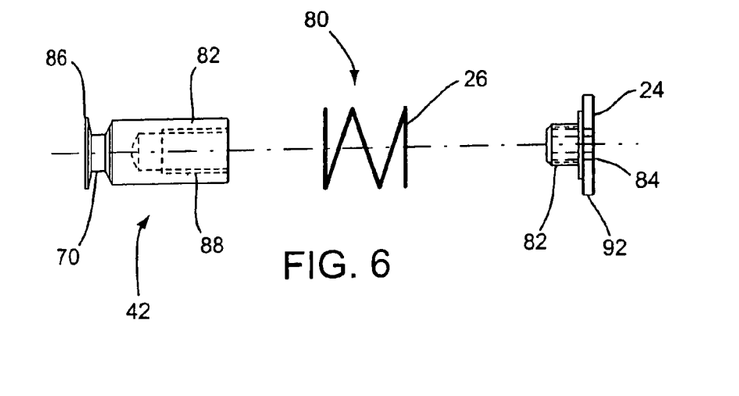
FIG. 6 is a side view assembly drawing of components to interfit with the aforementioned base members.

FIG. 6 is a partial assembly drawing of a preferred pin/spring arrangement or assembly. In it, button/cap 24 is secured to plunger 42 via complementary threadings 82. A socket 84 may be provided in one piece (or each piece) to facilitate tightening them relative to one another. As shown, member 42 includes a head 86 having a diameter larger than that of the barrel section 88. Accordingly, by virtue of the size of a bore 90 in which the barrel is received in the base piece(s), head 86 serves as a stop on one end, and the button head 92 (in conjunction with spring 26 on the other, thereby effectively trapping the pin assembly within bore 90.

To facilitate smooth and consistent action, as well as handle the torsional loads applied the pin by virtue of holding down a heavily sprung fork, bore 90 should have an adequate length (shown as "L"). This length may range from about 0.25 inches upward.

Figure 7A:
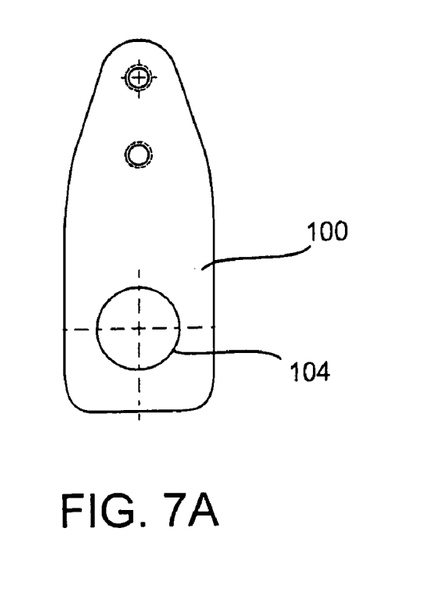
FIGS. 7A and 7B are top and side views, respectively of supplemental bracket member for use with a fork guard as shown in FIG. 1A.
Figure 7B:
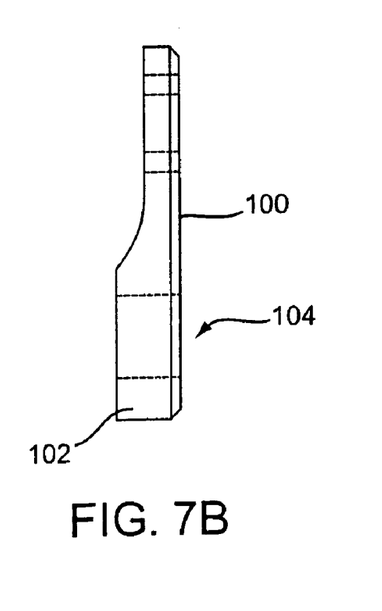

Finally, the optional hardware in FIGS. 7A and 7B is noted. This bracket member 100 may be used at the base of a fork guard 12 such as shown in FIG. 1A. Its purpose is to provide an improved bolt interface so that repeated strain by virtue of use of the subject restraint device(s) do not damage the guard material—which is often plastic. Bracket 100 fits many fork guards with extension section 102 facing toward the guard. With the bracket configuration shown, the stock bolt otherwise provided to hold the base of the fork guard is replaced with a shoulder bolt to account for the length of bore 104. The piece shown is CNC machined, but where a bent strip of metal or a composite piece is to be used, one may simply use the stock bolts to secure the bracket.

Regarding material as used in producing other parts of the invention, each of the components (save for the spring and strap) are advantageously machined from aluminum alloy, such as 6061-T6. Of course, other material or constructional techniques may be used. Strap 50 may be plastic that is die cut or otherwise trimmed to shape. Any of these production details are believed to fall within the design abilities of those with ordinary skill in the art.

Though the invention has been described in reference to certain examples, optionally incorporating various features, the invention is not to be limited to the set-ups described. The invention is not limited to the uses noted or by way of the exemplary description provided herein. It is to be understood that the breadth of the present invention is to be limited only by the literal or equitable scope of the following claims.

The invention claimed is:

1. A suspension fork temporary restraint system comprising:
    a base, a pin, a spring and a fork interface member, said base configured to slidingly receive said pin, said spring positioned to provide force resisting depression of said pin,
    said pin and said interface member including features that interfere with one another in a direction with at least a component perpendicular to an axis of said pin in order to laterally interlock an axial position of said pin upon compression of said suspension fork followed by depression of said in from an initial unlocked state when said base and said interface member are installed on said suspension fork,
    said temporary restraint system adapted to return said pin to said initial unlocked state upon additional compression of said suspension fork releasing the interlocking of said pin and said interface member and said spring forcing return of said pin to said initial unlocked state.

2. The system of claim 1, wherein said pin comprises a distal recess at a distal end of said pin, and said interface member comprises a complimentary ledge adapted for receipt of said pin distal end to provide the interlocking of said pin and interface member.

3. The system of claim 1, wherein said pin is capped by a button head at a proximal end.

4. The system of claim 3, wherein a coil spring is interposed between said base and said button head coaxially with said pin, said coil spring contacting each of said button head and said base.

5. The system of claim 1, wherein said base is attached to a fork guard for an inverted-style fork.

6. The system of claim 1, wherein said base is attached to a strap attached to a standard-style fork.

7. The system of claim 1, wherein said base includes a lateral mounting surface and a distal extension from said lateral mounting surface for receipt upon attachment to a fork guard or strap.

8. The system of claim 1, wherein said interface member comprises a split ring for attachment to said fork.

9. The system of claim 1, comprising a plurality of pins.

10. The system of claim 9, wherein only two pins are provided.

11. The system of claim 1, installed on a motorcycle suspension fork.

12. The system of claim 11, wherein said suspension fork is installed on a motorcycle.

13. A method of installing a suspension fork temporary restraint system, the method comprising:

providing a motorcycle suspension fork and a system according to claim 1; and attaching said base and said interface member to provide between about 3 and about 5 inches of compression upon locking said pin with said fork interface member.

14. The method of claim 13, wherein said base is attached to a fork guard.

15. The method of claim 13, wherein said base is attached to a strap attached to said fork.

16. The method of claim 13, where only one system according to claim 1 is attached to said fork.

* * * * *